Figure 1:
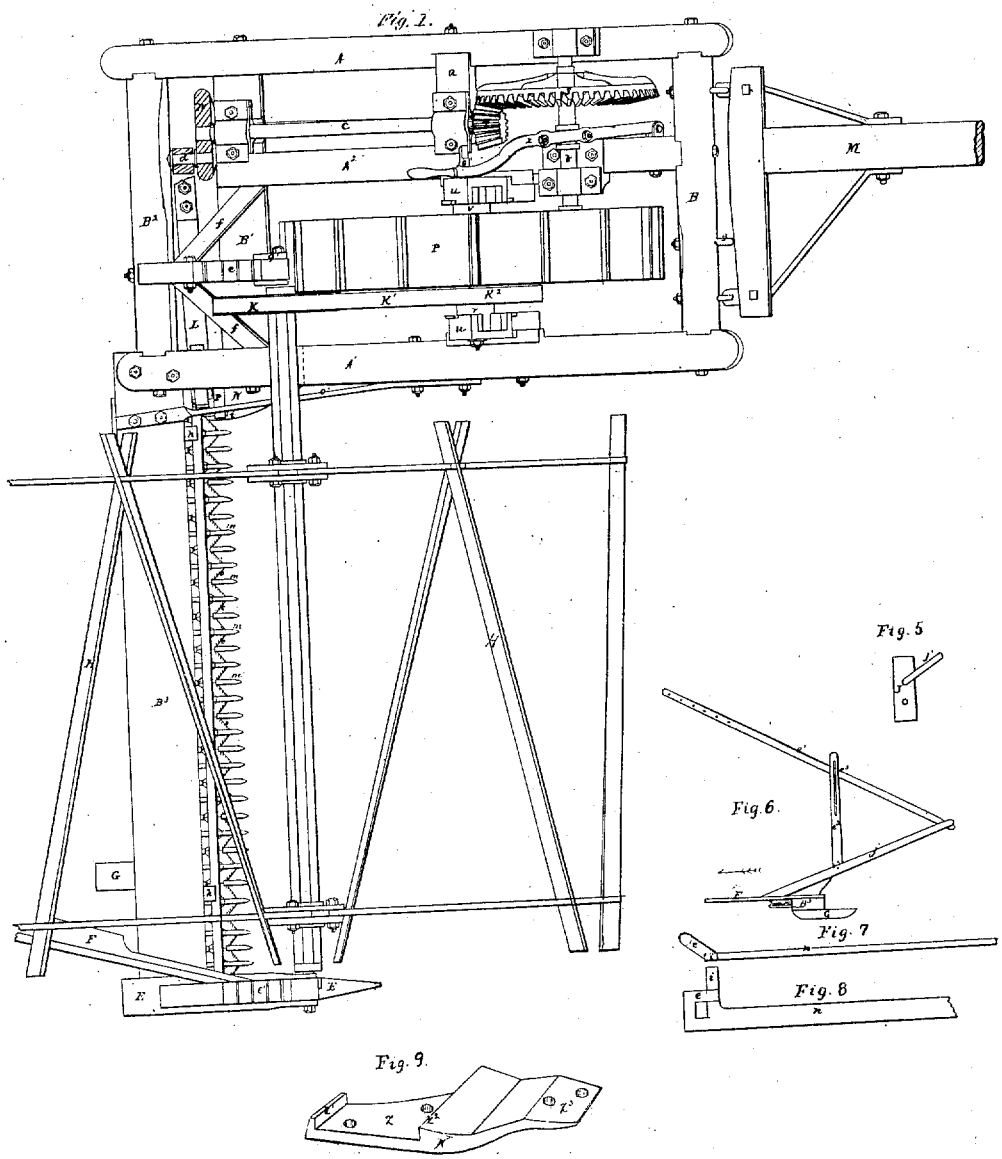

2 Sheets—Sheet 1.

H. GREEN.

HARVESTER.

No 561.

Reissued May 25, 1858.

THE NORRIS PETERS CO., PHOTO-LITHO., WASHINGTON, D. C.

H. GREEN
HARVESTER.
No 561. Reissued May 25, 1858.
Fig. 2
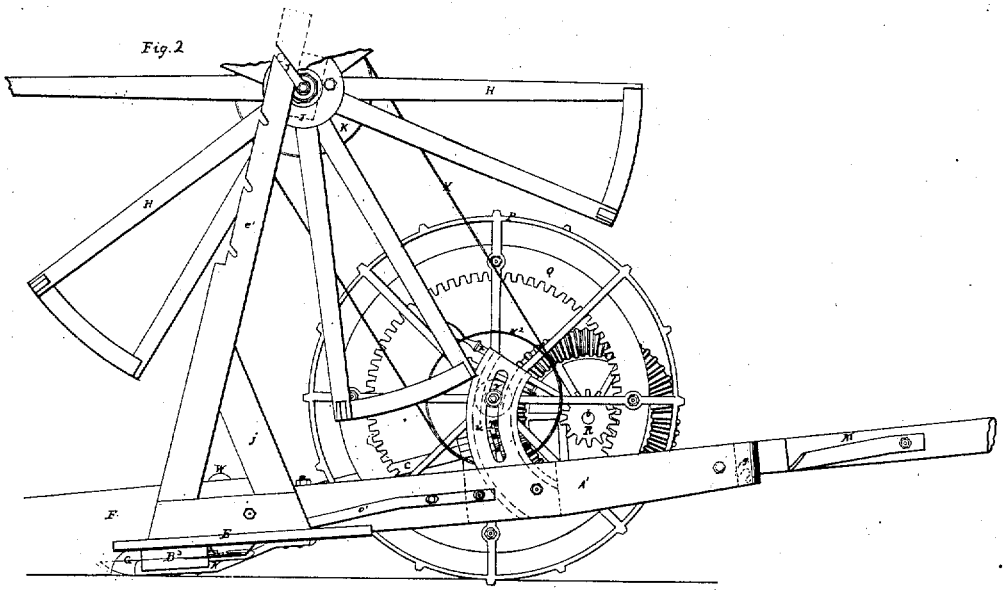
Fig. 3.
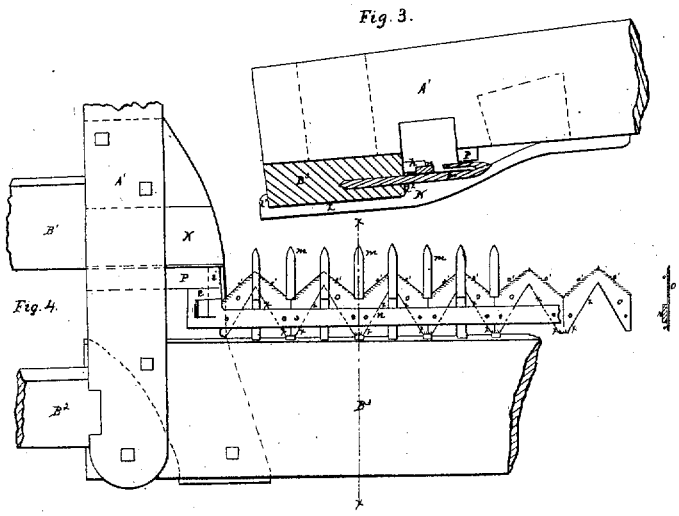
Fig. 4.
THE NORRIS PETERS CO., PHOTO-LITHO., WASHINGTON, D. C.

UNITED STATES PATENT OFFICE.

HENRY GREEN, OF OTTAWA, ILLINOIS.

IMPROVEMENT IN CUTTING DEVICES FOR HARVESTERS.

Specification forming part of Letters Patent No. 10,657, dated March 21, 1854; antedated September 21, 1853; Reissue No. 561. dated May 25, 1858.

*To all whom it may concern:*

Be it known that I, HENRY GREEN, of Ottawa, in the county of La Salle and State of Illinois, have invented a new and useful Improvement in Harvesting-Machines, of which the following is a full, clear, and exact description, reference being had to the accompanying drawings, which make part of this specification, and in which—

Figure 1 represents a plan of a harvesting-machine (as arranged for mowing grass) which embraces my improvement. Fig. 2 represents an elevation of the machine as seen when looking at it toward that end which runs next the standing grain or grass. Fig. 3 represents a section through the finger-beam at the line *x x* of Fig. 4, and an elevation of the shoe and of the adjacent parts of the frame, showing principally the manner in which the finger-beam is connected by means of the shoe to the frame. Fig. 4 represents a plan of the parts shown in Fig. 3. Fig. 5 represents a box, J, for the journal of the reel-shaft and a stirrup, J′, for suspending this box to the reel-post. Fig. 6 represents an arrangement of inclined arms which is deemed preferable, in most cases, to the post shown in Figs. 1 and 2 for supporting the axle of the reel over the divider. Fig. 7 represents an elevation of the back, and Fig. 8 a plan of that end of the bar *n* of the sickle which is shown in Fig. 4; and Fig. 9 represents a view in perspective of the shoe for connecting the finger-beam and gear-frame.

Of the above-mentioned figures, 1, 2, and 5 are made according to the scale of feet represented on the drawings; Figs. 3, 4, 7, and 8 upon a larger, and Fig. 6 upon a smaller, scale, and Fig. 9 upon a scale different from that of any of the rest of the figures.

The vibrating cutter of a harvesting-machine is usually made—for convenience of construction and facility of repairs—in two principal parts: first, the blade, which is sometimes a long narrow strip of plate steel, but generally it is made up of a series of short pieces of plate steel, each of which pieces is commonly called a "cutting-tooth," the united length of which pieces or teeth equals that of the long strip; and, second, the bar, which is commonly a rectangular rod of iron or steel, to which the blade or the teeth which make up the blade are secured by rivets, screws, or other means, and this bar is connected by one end to a crank or other equivalent device for imparting to the cutter its reciprocating or vibratory movement.

My improvements in the vibrating cutter consist of two distinct parts, the first of which relates to the manner in which the blade or the cutting-teeth of which it is composed are placed upon the bar to which they are secured; but this part of my improvement is entirely irrespective of the form of the blade or teeth.

The second part of my improvement relates to the form of the blade or of the cutting-teeth of which it is composed, and is entirely irrespective of the manner of arranging or placing them upon the bar to which they are attached; but as this second part of my improvement is made the subject of another and separate patent, I do not deem it necessary here to describe it more particularly.

In all harvesting-machines known to me previous to my invention that use a vibrating cutter the blade, whether scalloped or straight upon its cutting-edge, only reached as far back as the rear of the bar to which it was attached, and when any clogging matter accumulated behind the cutter and between it and the finger-bar or supporter of the cutting apparatus it hindered the free operation of the machine, as there was a considerable amount of rubbing surface in rapid vibration in contact with such clogging matter. Now, I have discovered that such difficulty may be to a great extent obviated by projecting the blade, or the teeth which make up the blade, over the rear side of the bar to which such blade is attached, thus removing the bar from contact with the clogging matter and leaving the very narrow surface of the rear of the blade only to rub in contact therewith.

My improvement in the sickle or cutting blade of reaping and mowing machines is exhibited in the drawings as applied to a complete mowing-machine; but as the invention claimed herein relates solely to the arrangement of the blade of the cutter upon the bar to which it is attached, and is applicable to all harvesting-machines using a vibrating cutter, I deem it unnecessary to describe particularly the frame of the machine, the reel, the shape of the blade of the cutter, or the gearing that gives motion to the cutter and to the reel, as the details of construction of such parts of the machine have no bearing upon the invention herein claimed.

The improvement which I herein claim is also shown in the drawings, as applied to a vibrating cutter having a scalloped cutting-edge of the usual form in front. The blade of this vibrating cutter is made up of a series of cutting-teeth, O, which are placed upon a bar, *n*, and riveted thereto in such manner that the backs of the teeth project back of the bar. The cutting-teeth O are made of plate-steel, flat or plane on one side, and at their front edges, O′, beveled off and scored or sickled, as represented, to form the front cutting-edge of the sickle. This extension of the blade O behind the bar *n* is clearly shown at *s* in the cross-section of the cutter at the right-hand side of Fig. 4.

What I claim under this patent is—

Placing the blade or the cutting-teeth of a harvesting-machine on the vibrating bar to which they are secured so that the said blade or cutting-teeth may extend back and behind such bar, substantially in the manner and for the purpose specified.

In testimony whereof I have hereunto subscribed my name.

HENRY GREEN.

In presence of—
P. H. WATSON,
HENRY BALDWIN, Jr.